United States Patent
Strmen

(10) Patent No.: US 6,824,596 B2
(45) Date of Patent: Nov. 30, 2004

(54) GAS SCRUBBING DEVICE FOR ODORIZING EQUIPMENT OPERATION, SERVICE AND EMERGENCY

(76) Inventor: Jan Strmen, 34 Sunny Acres, Beaconsfield (CA), H9X 3B6

( * ) Notice: Subject to any disclaimer, the term of this patent is extended or adjusted under 35 U.S.C. 154(b) by 9 days.

(21) Appl. No.: 10/367,898

(22) Filed: Feb. 19, 2003

(65) Prior Publication Data

US 2004/0159238 A1 Aug. 19, 2004

(51) Int. Cl.[7] .............................................. B01D 53/04
(52) U.S. Cl. .............................. 96/135; 96/138; 96/140; 96/142; 96/151; 96/153
(58) Field of Search .......................... 96/108, 121, 130, 96/135, 138–143, 151, 153, 134, 154

(56) References Cited

U.S. PATENT DOCUMENTS

| | | | | |
|---|---|---|---|---|
| 2,404,468 A | * | 7/1946 | Vokes et al. ................... | 96/138 |
| 5,207,808 A | * | 5/1993 | Haruta et al. .................. | 96/131 |
| 5,407,647 A | | 4/1995 | Tarancon | |
| 5,509,956 A | | 4/1996 | Opperman et al. | |
| 5,529,614 A | | 6/1996 | Engler et al. | |
| 5,814,129 A | * | 9/1998 | Tentarelli ........................ | 95/90 |
| 5,843,206 A | | 12/1998 | Dehn et al. | |
| 5,910,165 A | * | 6/1999 | Haramoto et al. ............. | 62/474 |
| 6,152,996 A | * | 11/2000 | Linnersten et al. ............ | 96/135 |
| 6,179,903 B1 | * | 1/2001 | Muller .......................... | 96/55 |
| 6,217,639 B1 | * | 4/2001 | Jackson ....................... | 96/134 |
| 6,468,333 B2 | * | 10/2002 | Spiegelman et al. .......... | 96/135 |
| 2001/0017080 A1 | * | 8/2001 | Dozoretz et al. ............. | 96/108 |

FOREIGN PATENT DOCUMENTS

| | | | |
|---|---|---|---|
| DE | 37 12 279 A1 | * | 10/1988 |
| DE | 003810646 A1 | | 10/1989 |
| DE | 003828602 A1 | | 3/1990 |
| JP | 363059332 A | | 3/1988 |
| JP | 401300046 A | | 12/1989 |

* cited by examiner

Primary Examiner—Robert H. Spitzer
(74) Attorney, Agent, or Firm—Ogilvy Renault; Kevin P. Murphy

(57) ABSTRACT

A gas scrubbing device for removing odorous gases from streams of natural gas or air. The device can be used either as conventional filter to filter excess odorous gas before the gas is discharged from the system or as a fume hood to capture any odorous vapor that might be released in the air at an odorant injection site.

17 Claims, 5 Drawing Sheets

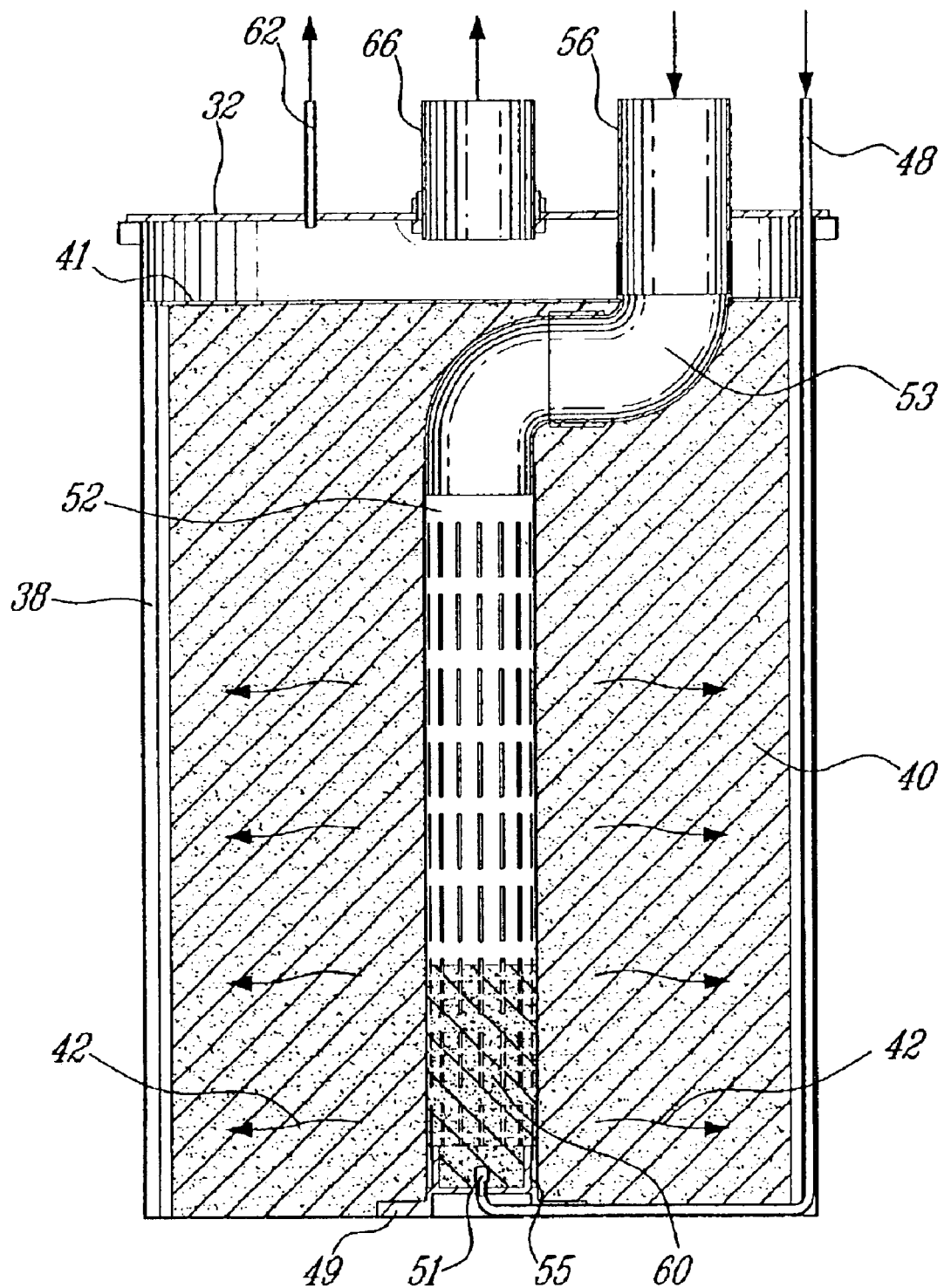
FIG_4

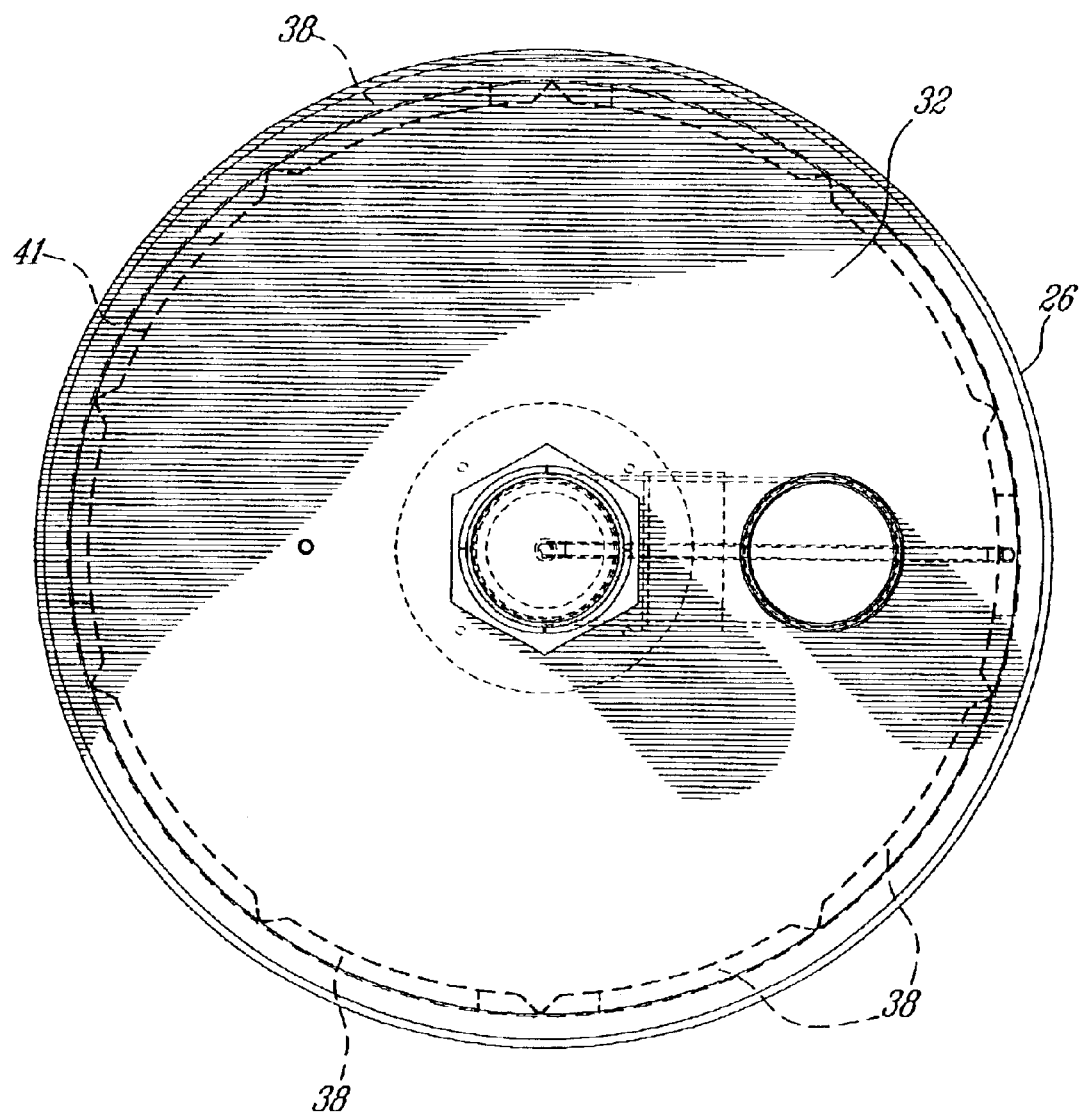

GAS SCRUBBING DEVICE FOR ODORIZING EQUIPMENT OPERATION, SERVICE AND EMERGENCY

BACKGROUND OF THE INVENTION

1. Field of the Invention

The present invention relates to the odorization of odorless gases and, more particularly, to a gas scrubbing device for providing odorant vapor filtration during regular operation, maintenance and failure of odorant delivery equipment used in the odorization of an odorless gas.

2. Description of the Prior Art

Odorants are added to odorless gases, such as natural gas, so that they can be detected easily by smell. Conventional odorants include mercaptans, methyl sulfides, aliphatic sulfides, dimethylsulfide as well as various blends of other commonly accepted chemicals. Odorants used with natural gas are extremely odiferous and volatile, so that only a small amount of liquid is needed to odorize a relatively large volume of natural gas.

Various techniques have been developed for odorizing natural gas. One technique consists of injecting liquid odorant directly into the natural gas pipeline. A high pressure injection pump draws odorants from a liquid storage tank into the gas pipeline where the odorants evaporate throughout the gas in the pipeline. Liquid odorant pressure is typically stepped down in the injection system and the released pressure is directed into an expansion tank. At regular intervals, gas is released from the expansion tank so as to maintain the pressure within the expansion tank under a predetermined pressure threshold. The gas released from the expansion tank is passed through a filter before being discharged as an odorant-free gas.

A second technique for odorizing natural gas consists of bypassing a small amount of natural gas through a tank containing liquid odorant. The bypass gas leaves the tank saturated with odorant gas and is then returned back into the main gas pipeline where it diffuses throughout the pipeline. The odorizing equipment is typically depressurized during odorant re-fill and the released odorant gas is typically flared or filtered by adsorption before being discharged as a non-toxic odorless gas.

Often the failure of such odorizing equipment results in odorant being released into the surrounding environment. Servicing operations on the equipment and re-filling of the storage tank is also generally associated with the release of odoriferous gases into the atmosphere. Due to the dangerous nature of odorous gases and the ever increasing sensitivity of public to odors, it is essential to minimize odorant smell releases, which are not associated with leaks of the natural gas distribution system. Heretofore, there has been very little protection to prevent odorous gases from escaping into the environment as a result of equipment failure, maintenance operations and small spills of liquid odorant during re-filling of the storage tank.

It would thus be desirable to provide a new gas scrubbing device which is adapted to scrub odorants from the air at the odorization site as well as filter excess odorant gases before being vented from the odorizing system.

SUMMARY OF THE INVENTION

It is therefore an aim of the present invention to provide a gas scrubbing device that can be used for filtering the air at an odorization site as well as for filtering odorant gases before being released from the system.

It is also an aim of the present invention to provide odorant vapor scrubbing through the use of a single unit capable of scrubbing odorant vapors from minimal through flow to relatively high gas through flow.

It is a further aim of the present invention to provide a gas scrubbing device adapted to scrub very low concentration of odorant gases.

It is a still further aim of the present invention to provide a gas scrubbing device adapted to prevent release of odor into the environment during regular operation of an odorant delivery system as well as during maintenance and failure of the system.

Therefore, in accordance with the present invention, there is provided a multi-operation mode gas scrubbing device for removing odorous gases released during the regular operation of an odorant delivery system as well as during the maintenance and failure of the system, the device comprises a tank housing a filtration medium for adsorbing odorous gases, normally-open main inlet and main outlet adapted to be connected in fluid flow communication with the odorant delivery system for removing odorous gases from a gas stream during normal operation conditions, a normally-closed maintenance/emergency inlet openable under maintenance and emergency conditions for allowing odorous gas released from the odorant delivery system into the surrounding environment to be drawn through the filtration medium, and an air mover connected to a normally-closed maintenance/emergency outlet of the tank for drawing, through said filtration medium via said normally-closed maintenance/emergency inlet, the odorous gases released from the system, thereby preventing release of odors into environment during maintenance and failure of the system.

In accordance with a further general aspect of the present invention, there is provided a multi-operation mode gas scrubbing device for use with odorizing equipment, comprising a tank housing a filter medium, a pair of normally-open inlet and outlet adapted to be connected in flow communication with the odorizing equipment for providing for passive scrubbing of odorant vapors generated during regular operation of the odorant delivery system, and a pair of normally-closed inlet and outlet adapted to be opened under maintenance, re-fill, or emergency conditions for providing for active odorant vapor filtration of the odorant vapors released in the environment surrounding the odorizing equipment, said normally-closed outlet being adapted to be operatively connected to an air mover for drawing outside air through said normally-closed inlet.

In accordance with a still further general aspect of the present invention, there is provided a multi-operation mode gas scrubbing device for removing odorous gases released during the regular operation of an odorant delivery system as well as during the maintenance and failure of the system, the device comprises a tank housing a filtration medium for absorbing odorous gases, a normally-open main inlet adapted to be connected in fluid flow communication with the odorant delivery system for removing odorous gases from a gas stream during normal operation conditions, a normally-closed maintenance/emergency inlet openable under maintenance and emergency conditions for allowing odorous gas released from the odorant delivery system into the surrounding environment to be drawn through the filtration medium, and an air mover connected to an outlet of the tank for drawing the odorous gases released from the system through said filtration medium via said normally-closed maintenance/emergency inlet, thereby preventing release of odors into environment during maintenance and failure of the system.

According to a further aspect of the present invention, suction (air through flow) is generated by either electrical fans or by air amplifier mounted either on top of the filter or preferably on the maintenance vehicle servicing the station (s). The apparatus has the capacity to prevent release of odor into the environment at the regular operating conditions, during maintenance, re-fill, or failure of the equipment, and in the case of spills of limited quantities of liquid odorants.

According to a present invention, odorant gases are removed from natural gas or air streams by means of adsorption on an activated carbon substrate. The carbon filter is combining capability of passive filter for capturing vapors of odorants during the regular operation of odorant delivery equipment or related equipment, with capacity for eliminating odorant vapors from escaping into environment during maintenance, re-fill, and failure of such equipment and also during emergencies due to liquid spills. The proposed invention allows for work in hazardous environment (presence of natural gas) by using nitrogen or air powered variable air amplifier (Venturi) systems, by moving suction systems out of hazardous area or using explosion proof suction devices.

BRIEF DESCRIPTION OF THE DRAWINGS

Having thus generally described the nature of the invention, reference will now be made to the accompanying drawings, showing by way of illustration a preferred embodiment thereof, and in which:

FIG. 4 is a vertical cross-section of the activated carbon filter shown in FIG. 2; and FIG. 5 is a top plan view of the activated carbon filter shown in FIG. 2.

DESCRIPTION OF THE PREFERRED EMBODIMENTS

Figure 1:
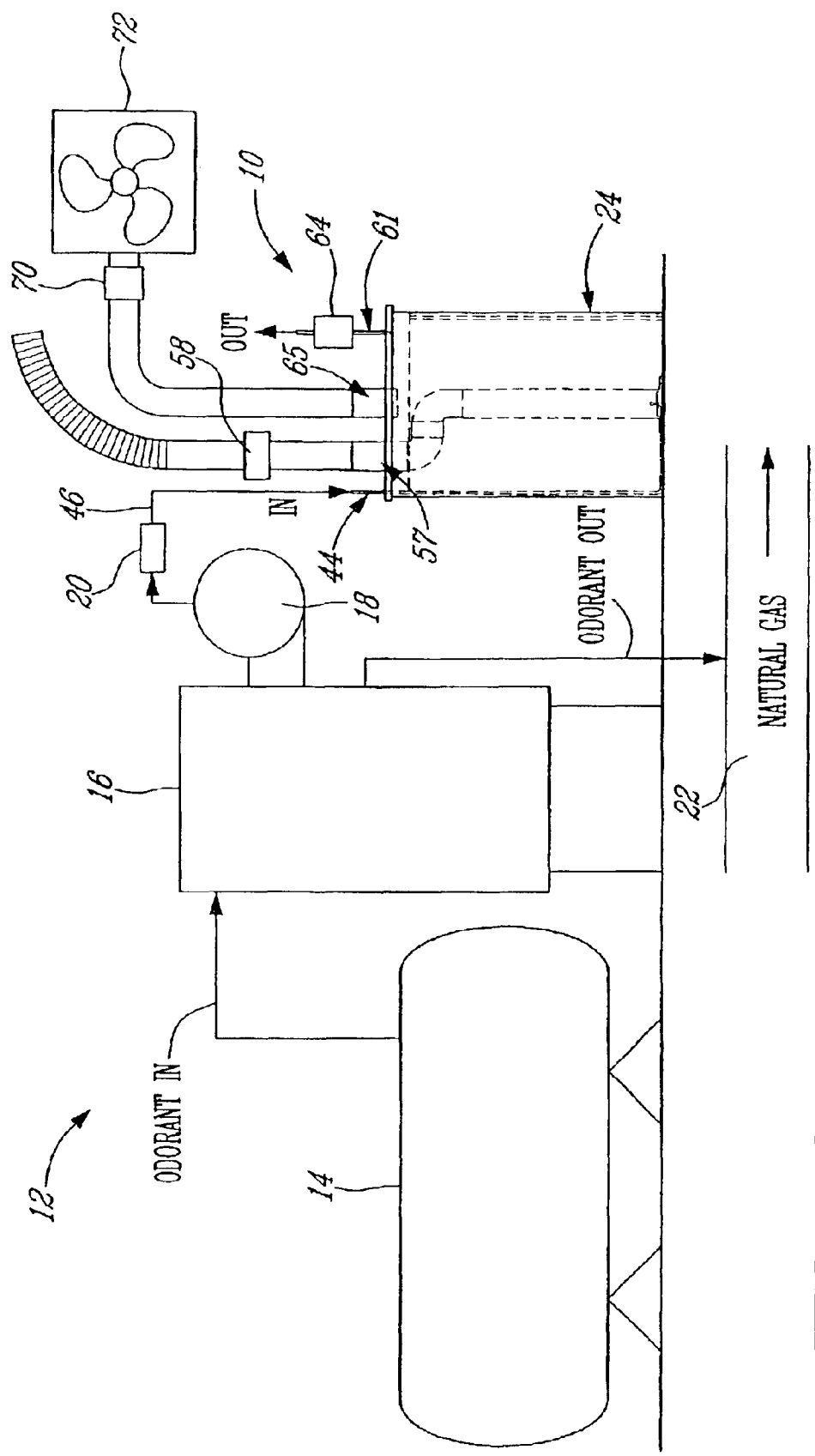
FIG. 1 is a schematic illustration of a gas scrubbing device connected in fluid flow communication with an expansion tank forming part of an odorant delivery system in accordance with a preferred embodiment of the present invention.

Now referring to the drawings, and in particular to FIG. 1, a multi-operation mode gas scrubbing device in accordance with the present invention and generally designated by numeral 10 will be described.

The gas scrubbing device 10 is operatively connected to one of a typical gas odorizing system 12 comprising an odorant storage tank 14, an odorant injection unit 16, an expansion tank 18 and a pressure relief valve 20. Odorant liquid is transferred from the storage tank 14 to the injection unit 16 by pressure. The injection unit 16 typically includes an injection pump for injecting odorant liquid directly into a natural gas pipeline 22. In operation, the odorant pressure is stepped down in the injection unit 16 and the released pressure is directed into the expansion tank 18. When the pressure in the expansion tank 18 builds up to a predetermined pressure threshold level set by the pressure relief valve 20, excess odorant gas is released from the expansion tank 18. The vented odorant gas passes through the gas scrubbing device 10 where odors are removed from the gas before the gas is released in the surrounding environment.

This represents one typical use of the gas scrubbing device 10 wherein the device is used for removing odors from excess odorous gases during regular operation of the natural gas odorization system 12. It understood that there is under instances where the pressure of the system as to be lowered and thus where odorant gas has to be released from the expansion tank 18. The gas scrubbing device 10 will be used in all these instances in order to adsorb and filter odors before the gas is released in the surrounding environment.

Furthermore, as will be explained hereinafter, the gas scrubbing device 10 is a multifunction unit which is also adapted to act as a "fume filtering hood" for capturing any odorous gases released into the air at the injection site as for instance during maintenance or re-fill of the system or as a result of a gas leak or during any other emergency situations requiring that the air at the injection site be filtered to ensure the safety of the persons working at the injection site.

Figure 2:
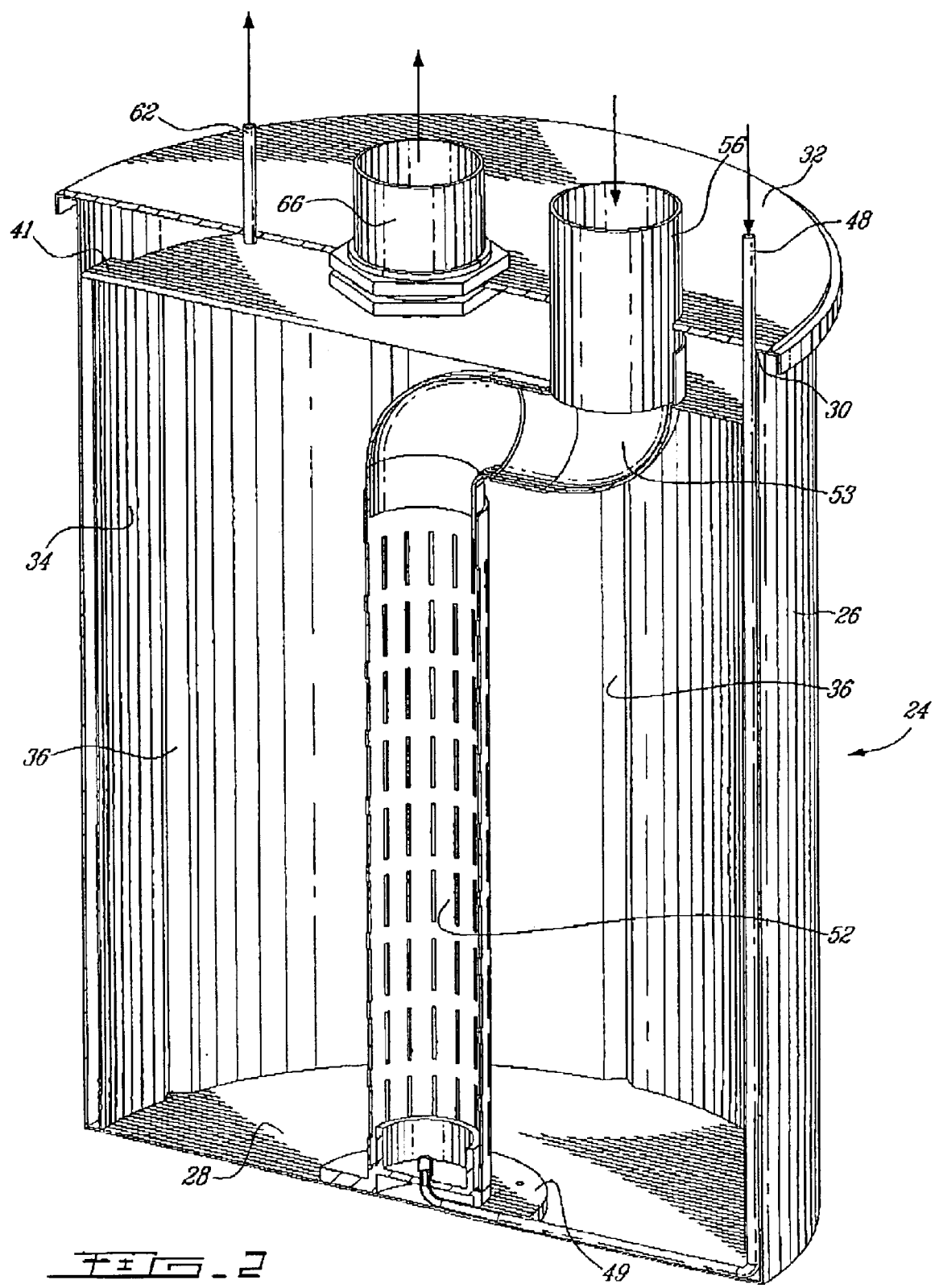
FIG. 2 is a perspective view in section of an activated carbon filter forming part of the gas scrubbing device shown in FIG. 1.
Figure 3:
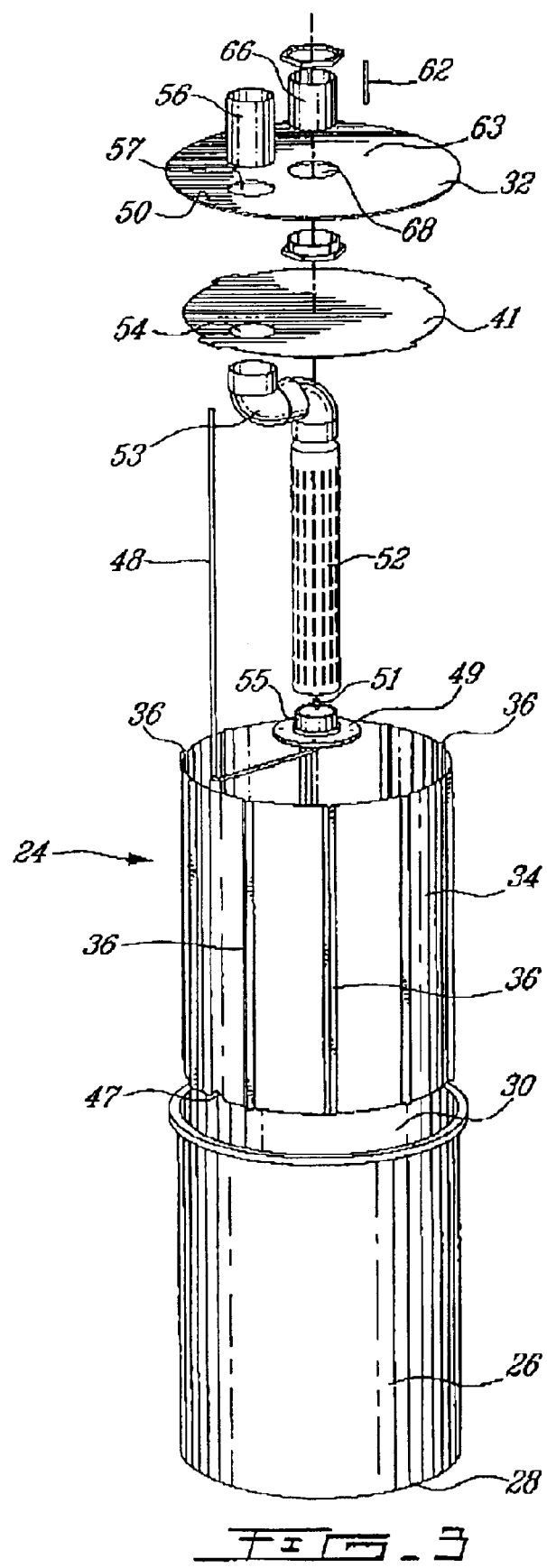
FIG. 3 is an exploded perspective view of the activated carbon filter shown in FIG. 2.

As shown in FIGS. 2 and 3, the gas scrubbing device 10 generally comprises an activated carbon filter 24. The filter 24 includes an elongated cylindrical tank 26 having a closed bottom end 28 and an open top end 30. The tank 26 can be made of plastic or metal material. The open top end 30 is closed by a removable lid or cover 32. A cylindrical perforated basket 34 is concentrically received within the tank 26. The basket 34 is preferably made of a sheet of screen material and is provided with a series of circumferentially spaced apart longitudinal spacers 36 on an outer surface thereof. The spacers 36 maintain the basket 34 at a distance from the inner surface of the tank 26 to form therewith a series of vertical passages 38 (see FIG. 5). The basket 34 is filled with activated carbon 40 (FIG. 4) and is closed at the top by a gas impermeable barrier 41 to force the gas to flow horizontally through the bed of activated carbon 40, as illustrated by arrows 42 in FIG. 4. The barrier 41 can be made of plastic.

During regular operation of the system, the odorous gas to be filtered is delivered into the filter 24 via a normally open inlet 44 (FIG. 1) thereof. As shown in FIG. 1, the normally open inlet 44 is connected in fluid flow communication with the exhaust side of the pressure relief valve 20 via a line 46. As shown in FIGS. 2 and 4, the normally open inlet 44 comprises a small inlet tube 48 extending throughout a hole 50 (FIG. 3) defined in the cover 32 and then along the inner wall of the tank 26 to the bottom of the tank 26 where the tube 48 extends horizontally to the center of the tank 26. A notch 47 is defined at the lower end of the basket for allowing the passage of the tube 48. The inlet tube 48 is received at it delivery end 51 within a large central perforated pipe 52 seated on a base 49 and connected at its upper end to an elbow 53 extending through a hole 54 (FIG. 3) defined in the horizontal barrier or partition 41. The elbow 53 is connected at it other end to an air inlet tube 56 extending out of the tank 26 via a hole 57 (FIG. 3) defined in the cover 32. As will be seen hereinafter, the air inlet tube 56 forms part of a maintenance/emergency inlet 57 of the filter 24 and is normally closed by a valve 58 (FIG. 1) or a plug.

As shown in FIG. 4, the perforated pipe 52 is completely surrounded by the body of activated carbon 40 and has a lower end portion which is fitted about a cylindrical projection 55 extending from the base 49. The base has a circular flange securely bolted to the bottom of the tank 26. A passage is defined in the base 49 for allowing the small inlet tube 48 to extend into the perforated pipe 52. The lower end portion of the perforated pipe 52 is filled with a layer of activated carbon 60 so as to cover the delivery end 51 of the small inlet tube 48 in order to prevent any odor escape through the air inlet tube 56 during regular operation of the filter 24.

As shown in FIG. 3, the filter is provided with a normally open outlet 61 including a small outlet pipe 62 extending through a hole 63 defined in the cover 32. A valve 64 is provided for closing the outlet pipe 62 when the filter is operated in a maintenance/emergency mode. However, during regular operation of the system, the outlet pipe 62 is normally opened.

As shown in FIG. 3, the filter 24 has a maintenance/emergency outlet 65 including a large outlet tube 66 received in a hole 68 defined in the center of the cover 32. As shown in FIG. 1, the outlet tube 66 is normally closed by a valve 70 and is connected to an air mover 72, such as a suction fan or an air amplifier (Venturi system). The air mover 72 can be mounted directly on the filter 24 or alternatively connected thereto by a hose or a fixed line. It some instances, for instance while working in areas requiring explosion proof equipment, it is advantageous to detach the air mover 72 from the filter and operate the same at a safe distance from the filter 24. The separation of the air mover 72 and the filter 24 also allows using a single common air mover for drawing air through a number of filters.

During regular operation of the system, the filter 24 is used to filter the excess gas released from the gas odorization system 12 and the inlet 44 and the outlet 61 are opened while the maintenance/emergency inlet and outlet 57 and 65 are closed. This provides for a passive scrubbing of the odorous gas released from the expansion tank 18. The odorous gas is discharged at the bottom of the filter 24 via the gas delivery end 51 of the inlet tube 48. Then the gas flows generally horizontally outwardly through the filter medium. The "clean gas" is received in the longitudinal passages 38 where the gas travels vertically upwardly before being discharged through the outlet pipe 62.

When maintenance or re-fill operations have to be done on the gas odorization system 12 or when there is an emergency because of a gas leak or spills of odorant, the inlet 44 and the outlet 61 are respectively closed by closing valves 20 and 64. The normally-closed outlet 65 is then opened by opening valve 70 and the air mover 72 is powered. Thereafter, the valve 58 is opened to open the normally-closed inlet 57 for allowing outside air outside to be drawn into the filter 24 in order to capture the odorous vapors. The air passes through the inlet tube 56 down into the perforated pipe 52 where the air is forced to travel horizontally through the bed of activated carbon 40. The filtrated air is received in the longitudinal passages where the air flows vertically upwardly before being discharged through the outlet tube 66. This provides for an active filtration of the air at the injection site.

To switch from the maintenance/emergency mode to the regular operation mode, one has simply to:

a) shut down the air mover 72, b) close both air inlet 57 and air outlet 65, and c) open both gas inlet 44 and gas outlet 61.

Saturation of the filter 24 is manifested by the faint smell of odorant. At this point, the activated carbon bed 40 has to be changed. This is done by removing the cover 32 and the spent carbon and by placing a new carbon bed in the basket 34. Spent carbon can be sent for recycling or disposal.

One advantage of the present invention resides in the fact that it provides for both active (through flow) and passive filtration of the gases. According to the present invention, vapor scrubbing is provided by a single unit capable of scrubbing odorant vapors from minimal through flow to high gas through flow up to 400 cfm.

Furthermore, the fact that all inlets and outlets are fitted through the removable cover 32 of the filter 24 simplifies the use, the maintenance and transport of the device.

As described hereinbefore, the gas scrubbing device is advantageous in that it is provided in the form of a multi-function unit that can for instance be used to provide:

a) passive scrubbing of excess of odorant vapors generated during regular operation of the odorant delivery system 12;

b) active scrubbing odorant vapors filtration during: Refilling of odorant equipment and storage tanks, changes of liquid filters, odorant line maintenance, injector pump or any other parts maintenance, and limited liquid spill containment.

What is claimed is:

1. A multi-operation mode gas scrubbing device for removing odorous gases released during the regular operation of an odorant delivery system as well as during the maintenance, re-fill and failure of the system, the device comprises a tank housing a filtration medium for absorbing odorous gases, normally-open main inlet and main outlet adapted to be connected in fluid flow communication with the odorant delivery system for removing odorous gases from a gas stream during normal operation conditions, a normally-closed maintenance/emergency inlet openable under maintenance and emergency conditions for allowing odorous gas released from the odorant delivery system into the surrounding environment to be drawn through the filtration medium, and an air mover connected to a normally-closed maintenance/emergency outlet of the tank for drawing, through said filtration medium via said normally-closed maintenance/emergency inlet, the odorous gases released from the system, thereby preventing release of odors into environment during maintenance and failure of the system.

2. A multi-operation mode gas scrubbing device as defined in claim 1, wherein independently operated valves are provided for controlling the operation of said main inlet, said main outlet, said maintenance/emergency inlet and said maintenance/emergency outlet.

3. A multi-operation mode gas scrubbing device as defined in claim 1, wherein said filtration medium includes a removable activated carbon body.

4. A multi-operation mode gas scrubbing device as defined in claim 1, wherein said maintenance/emergency inlet includes a perforated air intake pipe extending within said tank and surrounded by said filtration medium.

5. A multi-operation mode gas scrubbing device as defined in claim 4, wherein said main inlet includes a scrubber piping having a gas delivery end received within said perforated air intake pipe, and wherein said gas delivery end is covered with a body of filtration medium fitted within said perforated air intake pipe to prevent odor escape during regular operation.

6. A multi-operation mode gas scrubbing device as defined in claim 1, wherein said tank includes a removable lid, and wherein said main inlet, said main outlet, said maintenance/emergency inlet and said maintenance/emergency outlet are all provided in said lid in order to simplify use, maintenance and transport of the device.

7. A multi-operation mode gas scrubbing device as defined in claim 1, wherein said air mover is located at a distance from said tank and connected to said maintenance/emergency outlet by a conduit.

8. A multi-operation mode gas scrubbing device as defined in claim 1, wherein said filtration medium is received in a perforated basket placed in said tank, wherein a barrier is mounted on top of said basket to force the gas to flow laterally outwardly through said filtration medium, and wherein said perforated basket and said tank defines an annulus passage in fluid flow communication with said main outlet and said maintenance/emergency outlet for receiving filtrated gas from the filtration medium and allowing the filtrated gas to be expelled from the tank.

9. A multi-operation mode gas scrubbing device for use with odorizing equipment, comprising a tank housing a filter medium, a pair of normally-open inlet and outlet adapted to be connected in flow communication with the odorizing equipment for providing for passive scrubbing of odorant vapors generated during regular operation of the odorant delivery system, and a pair of normally-closed inlet and outlet adapted to be opened under maintenance or emergency conditions for providing for active odorant vapor filtration of the odorant vapors released in the environment surrounding the odorizing equipment, said normally-closed outlet being adapted to be operatively connected to an air mover for drawing outside air through said normally-closed inlet.

10. A multi-operation mode gas scrubbing device as defined in claim 9, wherein independently operated valves are provided for controlling the operation of said normally-open inlet and outlet, and said normally-closed inlet and outlet.

11. A multi-operation mode gas scrubbing device as defined in claim 9, wherein said filter medium includes a removable activated carbon body.

12. A multi-operation mode gas scrubbing device as defined in claim 9, wherein said normally-closed inlet includes a perforated air intake pipe extending within said tank and surrounded by said filter medium.

13. A multi-operation mode gas scrubbing device as defined in claim 12, wherein said normally-open inlet includes a scrubber piping having a gas delivery end received within said perforated air intake pipe, and wherein said gas delivery end is covered with a body of filter medium fitted within said perforated air intake pipe to prevent odor escape during regular operation.

14. A multi-operation mode gas scrubbing device as defined in claim 9, wherein said tank includes a removable lid, and wherein said normally-open inlet, said normally-open outlet, said normally-closed inlet and said normally-closed outlet are all provided in said lid in order to simplify use, maintenance and transport of the device.

15. A multi-operation mode gas scrubbing device as defined in claim 9, wherein said air mover is located at a distance from said tank and connected to said maintenance/emergency outlet by a conduit.

16. A multi-operation mode gas scrubbing device for removing odorous gases released during the regular operation of an odorant delivery system as well as during the maintenance and failure of the system, the device comprises a tank housing a filtration medium for absorbing odorous gases, a normally-open main inlet adapted to be connected in fluid flow communication with the odorant delivery system for removing odorous gases from a gas stream during normal operation conditions, a normally-closed maintenance/emergency inlet openable under maintenance and emergency conditions for allowing odorous gas released from the odorant delivery system into the surrounding environment to be drawn through the filtration medium, and an air mover connected to an outlet of the tank for drawing the odorous gases released from the system through said filtration medium via said normally-closed maintenance/emergency inlet, thereby preventing release of odors into environment during maintenance and failure of the system.

17. A multi-operation mode scrubbing device as defined in claim 16, wherein said outlet includes a normally-open outlet port and a normally-closed outlet port, said normally-closed outlet port being operatively connected to said air mover.

* * * * *